United States Patent [19]

Titus

[11] Patent Number: 4,459,629

[45] Date of Patent: Jul. 10, 1984

[54] ELECTRIC CIRCUIT BREAKER UTILIZING SEMICONDUCTOR DIODES FOR FACILITATING INTERRUPTION

[75] Inventor: Charles H. Titus, Newtown Square, Pa.

[73] Assignee: General Electric Company, King of Prussia, Pa.

[21] Appl. No.: 323,831

[22] Filed: Nov. 23, 1981

[51] Int. Cl.³ .......... H02H 7/22

[52] U.S. Cl. .......... 361/3; 361/8; 361/13; 361/11; 307/134

[58] Field of Search .......... 361/3, 5, 6, 7, 9, 8, 361/10, 11, 13, 2; 307/134, 135

[56] References Cited

U.S. PATENT DOCUMENTS

| | | | |
|---|---|---|---|
| 1,669,493 | 5/1928 | Slepian . | |
| 1,819,207 | 8/1931 | Slepian . | |
| 3,018,414 | 1/1962 | Albright | 361/10 X |
| 3,293,496 | 12/1966 | Induni | 361/6 X |
| 3,395,316 | 7/1968 | Denes | 361/10 |
| 3,466,503 | 9/1969 | Goldberg | 361/13 X |
| 3,611,031 | 10/1971 | Lutz | 361/9 |
| 3,864,604 | 2/1975 | Pfanzelt | 361/6 |
| 4,209,814 | 6/1980 | Garzon | 361/5 |
| 4,289,941 | 9/1981 | Cannon | 200/146 |

*Primary Examiner*—Patrick R. Salce
*Attorney, Agent, or Firm*—William Freedman

[57] ABSTRACT

This electric circuit breaker comprises a main switch and two shunting paths respectively paralleling said main switch, each shunting path containing the series combination of an isolating switch and a diode assembly. The diode assemblies are connected in inverse-parallel relationship with each other. All of the switches are closed when the circuit breaker is closed, and during this interval substantially all current through the circuit breaker is through the main switch. During a circuit-interrupting operation, the three switches are opened. First, the main switch is opened to divert current into one of the shunting paths, and then the isolating switches are opened to complete the interrupting operation with assistance from the diode assemblies.

12 Claims, 6 Drawing Figures

ELECTRIC CIRCUIT BREAKER UTILIZING SEMICONDUCTOR DIODES FOR FACILITATING INTERRUPTION

BACKGROUND

This invention relates to an alternating current electric circuit breaker that uses semiconductor diodes to facilitate circuit interruption and, more particularly, relates to a circuit breaker of this type that comprises separable main contacts for carrying continuous current through the circuit breaker and further comprises diodes into which the current is diverted upon opening of the main contacts during an interrupting operation.

When the main contacts of my circuit breaker are parted during an interrupting operation, an arc is immediately established between them; and the resulting arc voltage is used to divert the current from the main contacts into a low impedance path that shunts the main contacts and includes the series combination of a diode assembly and an isolating switch. When current starts to flow in the shunting path, the isolating switch is in the closed position; but after a short delay it is opened, causing an arc to develop between its then-separated contacts. Current passes through this shunting path via the arc until a first natural current zero occurs after arc-initiation, following which the usual recovery voltage transient builds up. This recovery voltage transient and the power-frequency voltage that succeeds it are applied across the previously-conducting shunting path, appearing principally across its diode assembly until the polarity of the voltage across this shunting path reverses.

SUMMARY

An object of my invention is to prevent this recovery voltage transient and the succeeding power-frequency voltage from re-establishing an arcing conductive path either through the main contacts or through the shunting path that had conducted the loop of current immediately preceding the first natural current zero.

Another object of my invention is to provide the above-described diode assembly in the shunting path with voltage-controlling means that assists the diode assembly in recovering its reverse-current blocking ability immediately following the above-described current loop, thus aiding the diode assembly in successfully withstanding the recovery voltage transient.

In carrying out my invention in one form, I provide a main switch that has separable contacts that are closed when the circuit breaker is closed and two separate shunting paths around the main contacts. Each of these shunting paths comprises the series combination of a diode assembly and an isolating switch that is also closed when the circuit breaker is closed. The diode assemblies are connected in inverse-parallel relationship with each other so that current flowing through the circuit breaker via the shunting paths flows in one direction through one shunting path and in the opposite direction through the other shunting path. Circuit-breaker opening is effected by first opening the main switch and then the isolating switches. Opening of the isolating switches is delayed until current is diverted from the main switch into one of the shunting paths; and through this one shunting path a first loop of power current flows until a natural current zero. If a second loop of power current flows through the circuit breaker after the first natural current zero, it is forced to flow through the other shunting path, i.e., the path that had not conducted the first loop.

To assist each of the aforesaid diode assemblies in recovering its reverse-current blocking ability immediately following a first loop of current therethrough, I provide in parallel with the diode assembly an R-C circuit comprising the series combination of a resistor and a capacitor and in parallel with both the diode assembly and the R-C circuit, I provide a voltage-limiting device, preferably of the zinc-oxide type.

DETAILED DESCRIPTION OF PREFERRED EMBODIMENT

The Switches and the Diode Assemblies

Figure 1:
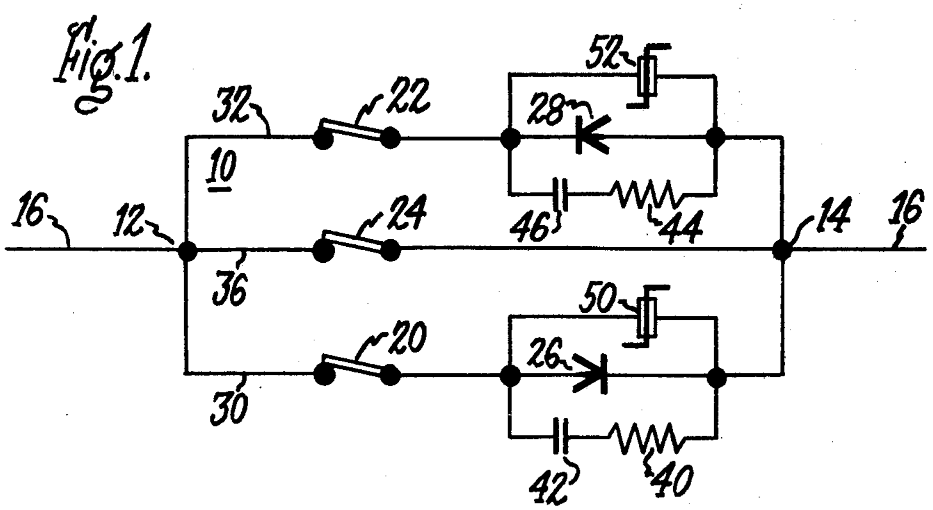
FIG. 1 is a schematic showing of a single-phase circuit breaker embodying one form of the invention and shown in closed position.

Referring now to FIG. 1, the schematically illustrated circuit breaker 10 comprises a pair of spaced-apart terminals 12 and 14 connected in one phase 16 of an alternating current power system. The illustrated circuit breaker further comprises three switches 20, 22, and 24, each comprising separable contacts and means (not shown in FIG. 1) for separating the contacts of the switches in appropriately timed relationship, as will soon be described in more detail. Switches 20 and 22 are referred to hereinafter as isolating switches and switch 24 as the main, or load-bypass, switch. The illustrated circuit breaker further comprises two semiconductor diode assemblies 26 and 28.

Depending upon the rating of the circuit breaker, each of the diode assemblies may comprise a single diode; or it may comprise a plurality of diodes connected in series to provide increased voltage-handling ability; or it may comprise a plurality of diodes connected in parallel to provide increased current-handling ability; or it may comprise a plurality of parallel combinations of diodes connected in series to provide both increased voltage and current-handling abilities.

A first circuit 30 connects diode assembly 26 and switch 20 electrically in series between the terminals 12 and 14; and a second circuit 32 connects diode assembly 28 and switch 22 electrically in series between the terminals 12 and 14. The diode assemblies 26 and 28 are connected in inverse-parallel relationship with each other so that current flowing between the terminals 12 and 14 through circuits 30 and 32 flows in one direction through circuit 30 and in the opposite direction through circuit 32.

A third circuit 36 connects the main switch 24 between the terminals 12 and 14 in parallel with the series combination of the first switch 20 and first diode assembly 26 and also in parallel with the series combination of the second switch 22 and the second diode assembly 28. When the three switches 20, 22, and 24 are in their closed position of FIG. 1, substantially all the current flowing between the terminals 12 and 14 flows via circuit 36. This is the case because with all the switches closed, the circuit 36 has a much lower impedance than the circuits 30 and 32 inasmuch as the diode assemblies 26 and 28 in circuits 30 and 32 have a significant impedance even to forward currents, even if the diode assembly comprises only a single diode. Stated another way, the forward voltage across a diode must exceed a predetermined minimum value, e.g., 0.7 volts, to produce significant current through the diode, and the impedance of circuit 36 is kept sufficiently low when the main switch 24 is closed to prevent the voltage across the diode from reaching said predetermined minimum value.

General Operation: Circuit Interruption

Figure 2:
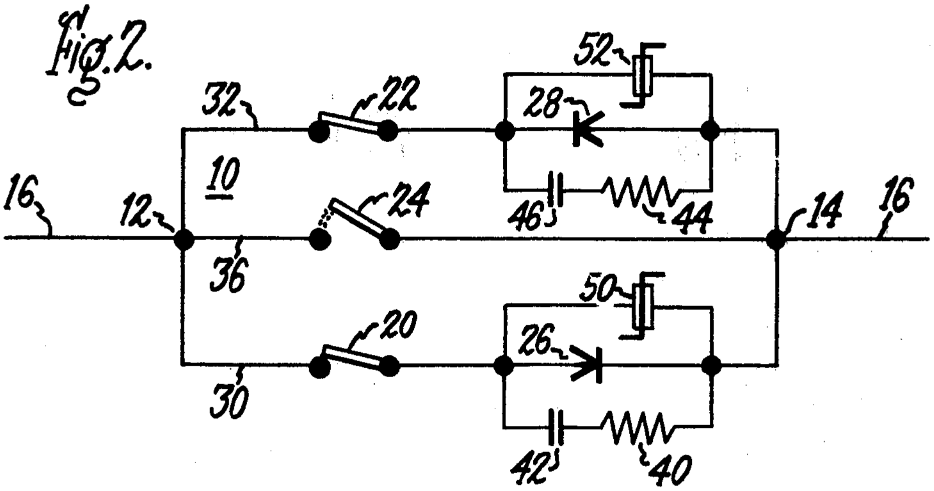
FIG. 2 is a schematic showing of the circuit breaker of FIG. 1 shown in a position through which it passes during an opening, or interrupting, operation.

Opening of the circuit breaker is effected by first opening the main switch 24. When the contacts of main switch 24 first separate during such opening, an arc is drawn between them, as shown in FIG. 2, and an arc voltage quickly builds up between the contacts. This arc voltage quickly increases the impedance of circuit 36 to a much higher value than that encountered by forward currents through the particular shunting circuit 30 or 32 that contains a diode assembly that is then forwardly biased. As a result, almost all the current through the circuit breaker is quickly diverted from the main circuit 36 into this particular non-blocking shunting circuit 30 or 32. The diverted current flows through the shunting circuit until a first natural current zero is reached, immediately following which the usual recovery voltage transient builds up across the three parallel-connected circuits 30, 32 and 36.

If the three parallel-connected circuits 30, 32, and 36 can withstand this recovery voltage transient and the succeeding power-frequency voltage without a breakdown or other resumption of power current, the interrupting operation is completed at this time. If, however, a breakdown or other resumption of power current occurs at this time, I force it to occur in the shunting circuit 30 or 32 that had not been conducting prior to the first natural current zero. Following such occurrence, a second loop of current flows, this time through the previously non-conducting shunting circuit; and following this second loop, interruption is completed in a manner which will soon be described in more detail.

To produce the above-described performance, the isolating switches 20 and 22 are opened after opening of the main switch 24 and with sufficient delay to allow the above-described diversion of current into the shunting circuit with the then-forwardly-biased diode assembly.

First Operation Example: Circuit Interruption

If it is first assumed that the isolating switches 20 and 22 are opened during the first loop of current, it will be apparent that an arc will be developed during this first current loop at the then-conducting isolating switch (which we will assume is switch 20 in circuit 30). When the first natural current zero occurs following initiation of such arc, the resulting recovery voltage will be applied to the three parallel circuits 30, 32 and 36, tending to produce current through the circuit breaker in a direction opposite to that of the first current loop. Of the three switches 20, 22, and 24, the isolating switch 20 will have the least dielectric strength at this instant since it had been conducting the main current through the circuit breaker just prior to current zero; but there is a high likelihood that switch 20 will not break down at this instant because it has connected in series with it the diode assembly 26, which has then recovered its reverse-current blocking ability and is bearing most of the recovery voltage applied to the shunting circuit 30.

The main switch 24 is able to withstand the recovery voltage transient because the early diversion of current from switch 24 into switch 20 during the preceding current loop had greatly reduced the current through the main switch, allowing the gap between the contacts of switch 24 to easily recover its dielectric strength at the first current zero.

The other isolating switch 22, although it had not conducted during the first current loop, is vulnerable to breakdown by the first recovery voltage transient because substantially the entire recovery voltage transient is applied across it at the first current zero inasmuch as its associated diode assembly 28 is forwardly biased by this recovery voltage transient. Hence, if the first recovery voltage transient produces a breakdown, it will most likely occur at the switch 22, and the resulting second loop of current will be through the previously non-conducting shunting circuit 32, as desired. This current will be through the diode assembly 28 and an arc at the isolating switch 22.

After passage of this second loop of current through shunting circuit 32, the usual recovery voltage transient quickly builds up at the natural current zero immediately following this second loop. This recovery voltage is applied across the three parallel circuits 30, 32, and 36. Circuit 36, containing the main switch 24, is able to withstand this recovery voltage since the switch 24 has had the opportunity during the immediately-preceding loop of current to develop a relatively high dielectric strength between its contacts in view of the absence of arcing between said contacts during said immediately-preceding current loop. Shunting circuit 30 likewise has a high likelihood of successfully withstanding this recovery voltage since its isolating switch 20 also experienced no arcing during the immediately-preceding current loop. The remaining circuit (32) also has a high likelihood of successfully withstanding this recovery voltage since the diode assembly 28 therein is then in a blocking state relative to this recovery voltage. Although the gap between the contacts of switch 22 in circuit 32 has had relatively little time to develop dielectric strength when the second recovery voltage is applied, it does develop some, and this coupled with the blocking properties of the then-reverse-biased diode assembly 28 is usually sufficient to withstand the recovery voltage, as well as the succeeding power-frequency voltage.

Second Operating Example: Circuit Interruption

Let us next assume, as a second example, that during a circuit-breaker opening operation, the switches 20, 22, and 24 are opened in the same sequence as described in the preceding example but that the isolating switches 20 and 22 are not opened until after the first loop of current is completed, opening instead at an early point during the second loop of current. Let us further assume that he first current loop was through shunting circuit 30. I'he recovery voltage transient at the end of the first current loop is applied to the parallel combination of circuits 30, 32, and 36. The main circuit 36 can withstand this recovery voltage transient for one of the same reasons as pointed out in the previous example and, more specifically, because main switch 24 has carried only a small current during the preceding interval and the gap between its contacts thus has a good chance to recover its dielectric strength at the first current zero. The previously-conducting shunting circuit 30 is able to withstand this first recovery voltage transient because its diode assembly 26 is then in a reverse-current blocking state with respect to the recovery voltage transient. Moreover, with the isolating switch 22 in the previously non-conducting shunting circuit 32 still then closed, the shunting circuit 32 presents a low impedance path across both circuits 36 and 30 that prevents a significant voltage build-up across circuits 36 and 30, thus facilitating dielectric recovery of these circuits at the first current zero. The first recovery voltage transient and the immediately-following power frequency voltage simply drive current through the still-closed low-impedance shunting circuit 32 in a forward direction with respect to its diode assembly 28.

Continuing now with this second example, when the isolating switches 20 and 22 open during the second loop of current, an arc is formed across the contacts of switch 22, and current flows through this arc until the next current zero. The recovery voltage transient that is developed at this next current zero is withstood in the same manner as described in the previous example, it being understood that switch 20 has a relatively high dielectric strength to withstand this recovery voltage transient since no previous arcing occurred between its contacts in this second example.

The R-C Circuits and the Surge Limiters

To assist each diode assembly in recovering its reverse-current blocking properties immediately following a positive loop of current therethrough, each diode assembly is provided with a series R-C circuit connected in shunt with it. For example, diode assembly 26 has connected in shunt with it the R-C circuit including the series combination of a resistor 40 and a capacitor 42. This R-C circuit (40, 42) is connected in series with the switch 20. The other diode assembly 28 has a corresponding R-C circuit comprising the series combination of a resistor 44 and a capacitor 46 connected in parallel with diode assembly 28 and in series with switch 22.

When the current through a diode assembly passes through zero at the end of a loop of current therethrough, it tends to overshoot slightly in a negative direction and then return to zero current at a relatively high rate, causing a ringing condition to develop which dielectrically stresses the P-N junction of the diode or diodes of the diode assembly. The R-C circuit associated with the diode assembly reduces the initial magnitude and rate of change of the voltage associated with this overshoot and ringing condition, thus reducing the stresses on the P-N junction. For the R-C circuit to be effective in this respect, the resistance R of resistor 40 should be between $\frac{1}{2}$ and 2 times the surge impedance of the R-C circuit. Stated another way, R should be between $\frac{1}{2}$ and 2 times $\sqrt{L/C}$ of the R-C circuit, where L in its inductance and C its capacitance. It is to be understood that this R need not be a discrete component if the inductance of the R-C circuit is so low that its $\sqrt{L/C}$ is less than a few ohms, at which level there will be sufficient high frequency resistance in the circuit elements to provide the required damping that is desired from R.

It is also important that the inductance L of the R-C circuit be limited to a practical minimum, typically not exceeding $10^{-7}$ henries. This requires that the length of the leads in the circuit be limited as much as practical and that appropriate configurations be used for these leads and the other components of the R-C circuit.

Connected across each diode assembly so as to limit the maximum voltage appearing across the diode assembly is a surge limiting device that normally is essentially non-conductive but that becomes conductive should the voltage appearing thereacross exceed a predetermined threshold value. The surge limiting devices are shown at 50 and 52, respectively connected across the diode assemblies 26 and 28. Each is preferably a primarily zinc-oxide element, such as disclosed for example in U.S. Pat. No. 3,928,245-Fishman et al. Should one of these surge limiters become conductive in response to excessive voltage, e.g., in the form of a surge, it will allow current to flow therethrough until the voltage drops to a value slightly less than the threshold value, at which point the surge limiter returns to its normal non-conductive state. This voltage clipping action is especially helpful in limiting the maximum voltage applied to the diode assembly by the recovery voltage transient following a loop of current through the diode assembly.

Figure 6:
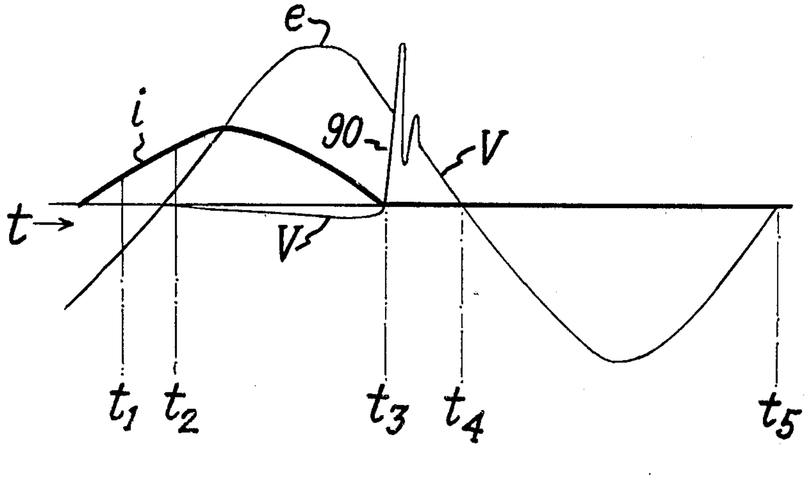
FIG. 6 is a graphic representation of voltage and current conditions during and following a loop of current through one of the shunting paths of the circuit breaker.
Figure 6:
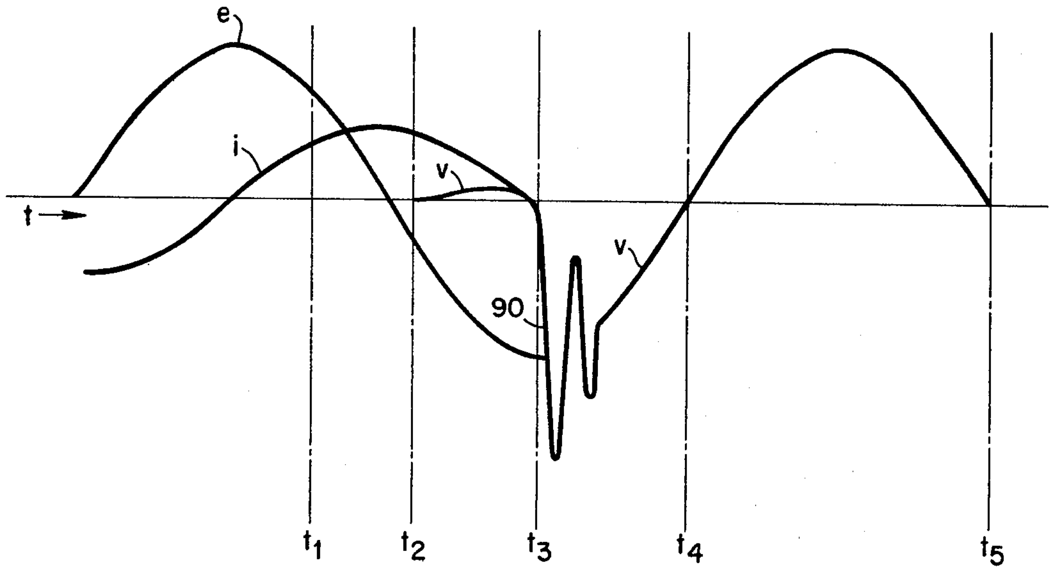

The above R-C circuits (at 40, 42 and 44, 46) play an additional important role in assuring successful interruption. In this connection, consider the conditions prevailing immediately following an interval of conduction through a shunting path (e.g., 30) containing a forwardly-biased diode assembly (26). This interval is depicted between instants $t_3$ and $t_4$ in FIG. 6, where curve i represents the current through the circuit breaker, curve e the source voltage, and curve V the voltage appearing across the circuit breaker, all plotted against time t as an abscissa. Current is diverted into the shunting circuit 30 at $t_1$, and switch 20 parts its contacts at $t_2$, drawing an arc and establishing an arc voltage V between instants $t_2$ and $t_3$. Current flows via the arc through the shunting circuit 30 during the interval between $t_2$ and $t_3$.

At the current zero point $t_3$ concluding such conduction interval, the recovery voltage transient 90 builds up and imposes a voltage on the previously-conducting shunting path (30) tending to produce reverse current therethrough, immediately following which the power-frequency voltage is applied in the same direction to this shunting path until passing through a natural voltage zero at $t_4$. Between $t_3$ and $t_4$ the voltage present across shunting circuit 30 appears principally across the diode assembly 26 in view of the reverse-current blocking properties of the diode assembly during this period and also in view of the high impedance of the R-C circuit 40, 42 in parallel with the diode assembly 26.

For the next succeeding half cycle of voltage (between $t_4$ and $t_5$), the power-frequency voltage V forwardly biases the diode assembly 26, and thus during this interval the gap at switch 20 must withstand the voltage V without significant assistance from the diode assembly 26. An important factor in determining whether the gap at switch 20 will be able to withstand this forward voltage between instants $t_4$ and $t_5$ is the amount of post-arc ionizing current that flows through the gap during the $t_3$–$t_4$ interval, assuming no breakdown of the gap between $t_3$ and $t_4$.

I am able to limit this post-arc ionizing current to a very low value by using in series with the gap an R-C circuit that has a very high impedance. More specifically, the impedance of the R-C circuit under power-frequency voltage condition is sufficiently high to limit the ionizing current through the gap between $t_3$ and $t_4$ to such a low value that the gap is able to withstand the voltage appearing thereacross between instants $t_4$ and $t_5$.

In an exemplary circuit breaker, the diode assemblies are capable of handling di/dt values of $10^7$ amps./sec. With each of these diode assemblies, I use an R-C circuit having a 60 Hz. capacitive reactance of $2.5\times10^5$ ohms, a series resistance (40 or 44) of 10 ohms, and an equivalent inductance for the R-C circuit of $7\times10^{-8}$ henries. The deionizing gap in series with this R-C circuit functioned effectively without reignitions at voltages up to 2800 volts r.m.s.

Utilizing the above parameters, the effective impedance of the diode assembly and its associated R-C circuit increases by an enormous amount (e.g., by a factor of about $10^9$) in a time interval of less than one millisecond when the current through the shunting circuit passes through zero (at $t_3$) and attempts to reverse its direction.

Although a high impedance of the R-C circuit is very helpful in limiting the gap current under the above-described conditions, there are limits to how high this impedance might be. In this regard, the impedance of the R-C circuit must be sufficiently low to enable the R-C circuit to act as an effective snubber for the diode which limits to safe values the voltages imposed upon the P-N junction of the diode during the above-noted overshoot and ringing condition immediately following current zero. Thus, a balance between these two conflicting requirements must be selected, and the above example represents such a balance.

Closing of the Circuit Breaker

Figure 3:
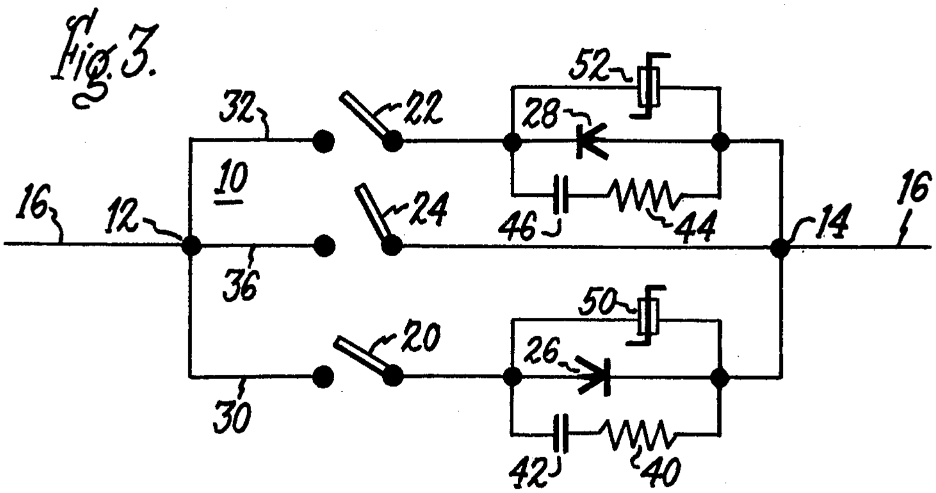
FIG. 3 is a schematic showing of the circuit breaker of FIG. 1 in its fully open position.

FIG. 3 shows the circuit breaker 10 after an opening operation has been completed. Closing of the circuit breaker is effected by restoring the switches 20, 22, and 24 from their positions of FIG. 3 to their positions of FIG. 1. The switch-operating mechanism is so constructed that during a circuit-breaker closing operation, the main switch 24 reaches its closed position before the isolating switches 20 and 22. As a result, the by-pass circuit 36 is completed prior to completion of the circuits 30 and 32, and thus the diode assemblies 26 and 28 are not required to carry current either during the closing operation or when the circuit breaker is fully closed.

Switch-Operating Arrangement

Any suitable conventional operating arrangement can be used for operating the switches 20, 22, and 24 in the above-described sequences. One such arrangement is shown in U.S. Pat. No. 4,289,941-Cannon, assigned to the assignee of the present invention, and incorporated by reference in the present application. Applicant's FIG. 4 corresponds to FIG. 2 of Cannon, except slightly modified in a manner explained hereinafter. The Cannon switch comprises a main movable contact member 10 and a main stationary contact 18 (shown in Cannon but not shown in applicant's FIG. 4), and these relatively movable contact parts can be used to form applicant's main, or load by-pass, switch 24. The Cannon switch also comprises (at one side of its main movable contact member 10) an auxiliary movable contact assembly 30 having a conductive movable blade that cooperates with auxiliary stationary contact members 64*a* and 64*b* (shown in FIGS. 4 and 5). These auxiliary contact members 30 and 64*a* and *b* can be used for a first one of my isolating switches, e.g., switch 20 in FIGS. 1–3. Another auxiliary switch identical to the first auxiliary switch (but not shown in Cannon) can be used for the other of my isolating switches 22. In the Cannon switching assembly, this second auxiliary switch would have a movable contact member disposed on the opposite side of the main movable contact member 10 from the first movable auxiliary switch assembly 30 and cooperating with the main movable contact member in the manner disclosed by Cannon.

Figure 4:
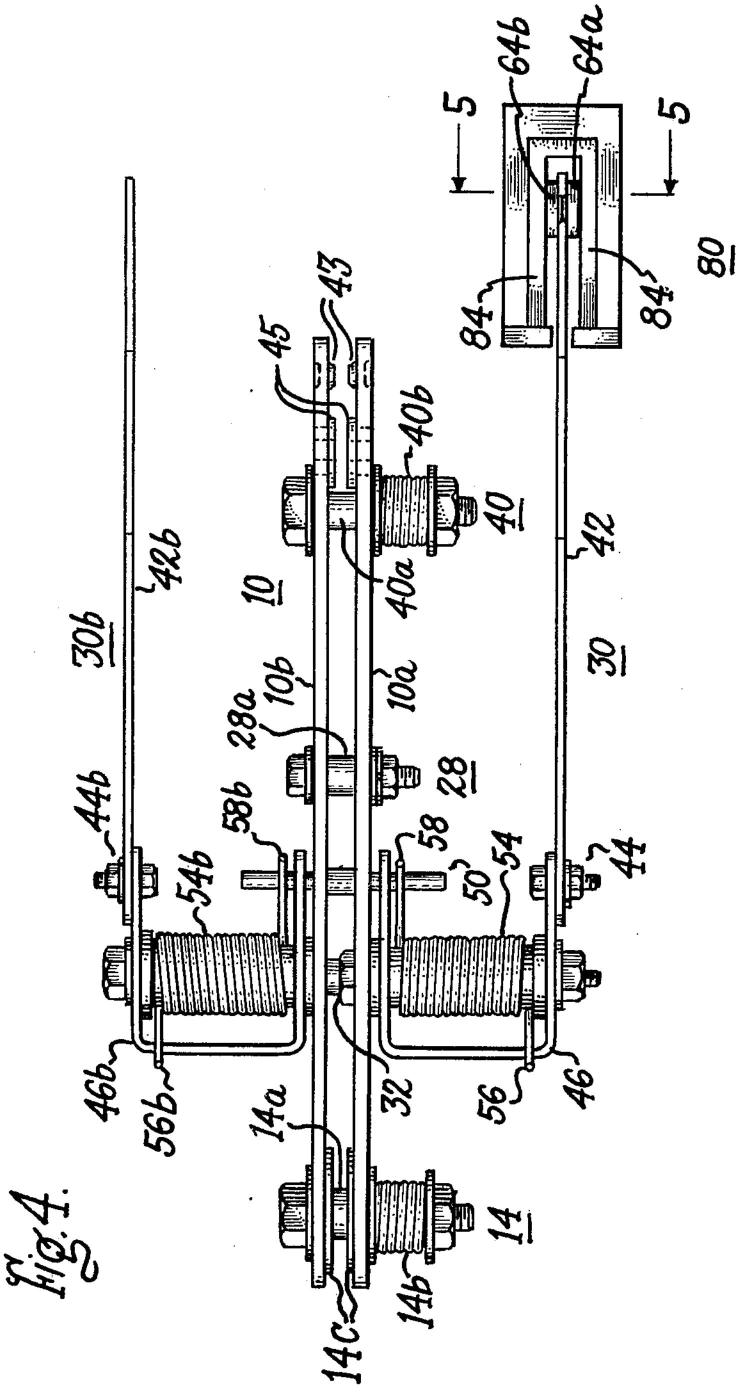
FIG. 4 is a plan view of an operating arrangement suitable for controlling the switches used in the circuit breaker of FIGS. 1-3.
Figure 5:
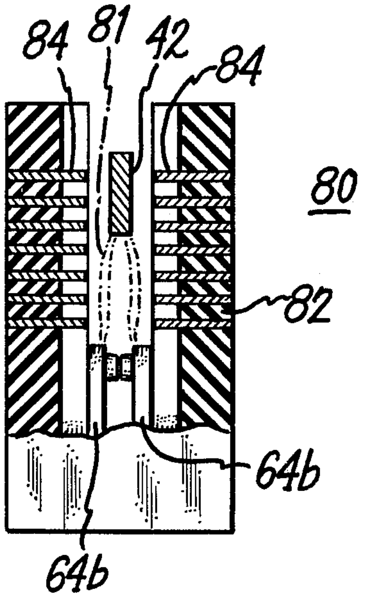
FIG. 5 is an enlarged sectional view along the line 5—5 of FIG. 4, showing the depicted parts during an opening operation.

In applicant's FIG. 4, the two auxiliary movable contact assemblies are shown at 30 and 30*b* on opposite sides of the movable main contact member 10. Corresponding parts of the two auxiliary assemblies have been assigned corresponding reference numerals except that the suffix "b" has been added to the reference numerals of the added assembly 30*b*.

The Cannon switch-operating arrangement will provide the desired operating sequence for applicant's switches since during an opening operation the main contacts open prior to the auxiliary contacts, and during a closing operation the main contacts close prior to the auxiliary contacts.

Although in the schematically illustrated embodiments of FIGS. 1–3 the switches 20, 22, and 24 are shown as single-break switches, it is to be understood that they can equally well be multiple-break switches in which the breaks of each switch are mechanically coupled together in a conventional manner for simultaneous operation. Using multiple instead of single break switches increases the voltage-handling ability of the circuit breaker.

Deionizing Chambers

Although in FIGS. 1–3 I have schematically illustrated the switches 20 and 22 as being simple knife switches, it is to be understood that in a preferred embodiment of my invention, I provide each of these switches with an appropriate deionizing chamber for enveloping the above-described arc that is drawn upon separation of the switch contacts during an opening operation. Such a deionizing chamber is shown at 80 in FIGS. 4 and 5, and the arc is shown at 81 in FIG. 5 between contact blade 42 and the stationary contact 64*a*, 64*b*. As further shown in FIGS. 4 and 5, the deionizing chamber comprises laterally-spaced side walls 82 of insulating material and metal plates 84 projecting laterally of the sidewalls and located at closely-spaced locations along the length of the arcing path.

The main purpose of this deionizing chamber 80 is to cool the arcing products at a rapid rate during the period around current zero, yet without forcing any high build-up of the arc voltage during the immediately-preceding arcing period. The intense cooling around current zero assists the inter-contact gap in quickly recovering its dielectric strength at current zero so as to enable the gap to withstand the above-described recovery voltage transient that builds up at this time. By avoiding a high build-up of arc voltage during arcing, I encourage the continued flow of current through the associated shunting path despite arc-initiation and discourage any restoration of current to the main current path 36 once the arc in the auxiliary switch has been initiated. Arc voltage build-up during arcing is inhibited (a) by making the arcing passage of a relatively large cross-section so as to avoid unduly confining the arc and so as to avoid splitting the arc into series-related arclets and (b) by using for the insulating sidewalls a material, such as zircon procelain, that evolves relatively little gas in response to the presence of an adjacent arc.

It is to be understood that the main switch 24 can also be provided with deionizing structure to aid it in rapidly building-up dielectric strength across its gap immediately following the brief interval when arcing occurs across this gap, as described hereinabove. The presence of such deionizing structure increases the likelihood that the gap will be able to successfully withstand the first recovery voltage transient. This deionizing structure can be of the same design as that used for deionizer 80.

General Discussion

It is to be noted that the illustrated diode assemblies 26, 28, carry significant current only for brief intervals during an interrupting operation. Under closed-circuit conditions substantially all of the circuit-breaker current flows through main switch 24. This means that the diode assemblies need no continuous current rating and require no expensive cooling means to reduce their heating during continuous currents through the circuit breaker. It also means that there are no power losses in the diode assemblies during continuous-current conditions.

Another advantage of my circuit breaker over a purely solid-state circuit breaker is that the mechanical switches 20, 22, and 24 constitute visible air break disconnect means that provides a readily observable indication of whether the circuit breaker is open.

I am aware of certain hybrid types of circuit breakers that use thyristors or other types of triggered devices in combination with separable-contact switches. Such triggered devices are usually more expensive than the simple diodes that I use; and, moreover, they require firing circuits, and this introduces additional complication and expense, which I avoid.

It is to be understood that the inductance of each of the shunting circuits 30 and 32 is kept as low as feasible in order to facilitate current transfer into it from the main circuit 36 upon opening of the main switch 24, as described hereinabove, during the early stages of a circuit-breaker opening operation.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In an electric circuit breaker for alternating current, (a) a pair of spaced terminals, (b) first and second semiconductor diode assemblies, (c) first and second switches each having separable contacts, (d) first circuit means for connecting said first switch in series with said first diode assembly between said terminals, (e) second circuit means for connecting said second switch in series with said second diode assembly between said terminals, (f) said diode assemblies being connected in inverse-parallel relationship with each other so that current flowing between said terminals through said first and second circuit means flows in one direction through said first circuit means and in the opposite direction through said second circuit means, (g) a third switch having separable contacts, (h) third circuit means connecting said third switch between said terminals in parallel with the series combination of said first switch and said first diode assembly and also in parallel with the series combination of said second switch and said second diode assembly, (i) means for maintaining all of said switches in closed position while said circuit breaker is closed, (j) said third circuit means having a much lower impedance to currents flowing between said terminals than each of said first and second circuit means when said three switches are closed so that substantially all of the current then flowing between said terminals flows via said third circuit means, (k) means effective during an opening operation for first opening said third switch and then opening said first and second switches during a single loop of current following opening of said third switch, (l) opening of said first and second switches being sufficiently delayed behind opening of said third switch to allow, upon opening of said third switch, the current flowing through said third circuit means in one direction between said terminals to be diverted into said first circuit means before said first switch opens and, in case the current flowing through said third circuit means is in the opposite direction between said terminals upon opening of said third switch, to allow said oppositely-flowing current to be diverted into said second circuit means before said second switch opens.

2. The circuit breaker of claim 1 in which the separable contacts of said first and second switches are parted during a single loop of current before completion of two loops of current through the circuit breaker following parting of the contacts of said third switch.

3. The circuit breaker of claim 2 in which the separable contacts of said first and second switches are parted sufficiently early that the first and second switches are capable of withstanding without breakdown the recovery voltage transient appearing across the circuit breaker immediately following said second current loop.

4. The circuit breaker of claim 2 in which the seaparable contacts of said first and second switches are parted during the first loop of current through the circuit breaker following parting of the contacts of said third switch.

5. A circuit breaker as defined in claim 1 which further comprises:

(a) R-C circuits respectively connected in parallel with said diode assemblies, each R-C circuit comprising the series combination of a resistance and a capacitance, the resistance having a value of between $\frac{1}{2}$ and 2 times the surge impedance of the R-C circuit, and (b) voltage-limiting devices respectively connected in parallel with said diode assemblies, each voltage-limiting device being of the type that: (i) is substantially non-conducting when the voltage thereacross is below a predetermined value, (ii) becomes conductive when said voltage slightly exceeds said value, and (iii) returns to its substantially non-conducting state when said voltage falls to a value slightly below said predetermined value, and in which:

(c) the R-C circuit and voltage limiting device paralleling said first diode assembly are connected in series with said first switch, and the R-C circuit and voltage-limiting device paralleling said second diode assembly are connected in series with said second switch.

6. A circuit breaker as defined in claim 1 and further comprising:

(a) a first R-C circuit connected in parallel with said first diode assembly and in series with said first switch and comprising the series combination of a resistance and a capacitance, (b) a second R-C circuit connected in parallel with said second diode assembly and in series with said second switch and comprising the series combination of a resistance and a capacitance, (c) voltage-limiting devices respectively connected in parallel with said diode assemblies, each voltage-limiting device being of the type that: (i) is substantially non-conducting when the voltage thereacross is below a predetermined value, (ii) becomes conductive when said voltage slightly exceeds said value, and (iii) returns to its substantially non-conducting state when said voltage falls to a value slightly below said predetermined value.

7. The circuit breaker of claim 1 in which each of said first and second switches includes deionizing structure enclosing the arc formed upon contact-separation during an opening operation and acting to effectively cool the arcing products generated by said arc, but without forcing a build-up in arc voltage high enough to reignite the gap then present between the contacts of said third switch.

8. The circuit breaker of claim 5 in which each of said first and second switches includes deionizing structure enclosing the arc formed upon contact-separation during an opening operation and acting to effectively cool the arcing products generated by said arc, but without forcing a build-up in arc voltage high enough to reignite the gap then present between the contacts of said third switch.

9. The circuit breaker of claim 7 or claim 8 in which each of said deionizing structures comprises spaced-apart metal components insulated from each other and located in spaced-apart locations along the length of the arc for effectively cooling the arcing products.

10. The circuit breaker of claim 7 or claim 8 in which the deionizing structure cools the arcing products with sufficient speed that no arcing current flows through either switch after a first loop of arcing current therethrough.

11. A circuit breaker as defined in claim 1 which further comprises:

circuit-breaker closing means for closing said first, second, and third switches to effect circuit-breaker closing, said closing means including means for delaying closing of the first and second switches until after said third switch has closed.

12. The circuit breaker of any one of claims 5, 6, 7 or 8 in which the impedance of each R-C circuit under power-frequency voltage conditions is sufficiently high to limit the ionizing current through the gap structure in the associated series-connected switch following a first loop of arcing current through said switch to such a low value that said gap structure is able to withstand without breakdown the voltage appearing thereacross during the next succeeding interval when the voltage across the circuit breaker forwardly biases the associated diode assembly.

* * * * *